(12) United States Patent
Chadha et al.

(10) Patent No.: US 7,495,761 B2
(45) Date of Patent: Feb. 24, 2009

(54) ARRAY DETECTOR COUPLED SPECTROANALYTICAL SYSTEM AND GRADED BLAZE ANGLE GRATING

(75) Inventors: Suneet Chadha, Westford, MA (US); Lawrence E. Curtiss, Concord, MA (US)

(73) Assignee: Foster-Miller, Inc., Waltham, MA (US)

( * ) Notice: Subject to any disclaimer, the term of this patent is extended or adjusted under 35 U.S.C. 154(b) by 369 days.

(21) Appl. No.: 11/347,482

(22) Filed: Feb. 3, 2006

(65) Prior Publication Data
US 2007/0182961 A1 Aug. 9, 2007

(51) Int. Cl.
*G01J 3/28* (2006.01)
(52) U.S. Cl. .................... 356/326; 356/328
(58) Field of Classification Search ......... 356/326–330; 385/31, 37; 250/339.02
See application file for complete search history.

(56) References Cited

U.S. PATENT DOCUMENTS

| | | | |
|---|---|---|---|
| 3,216,315 A * | 11/1965 | Keller | 356/334 |
| 4,387,955 A * | 6/1983 | Ludman et al. | 385/37 |
| 5,856,870 A | 1/1999 | Curtiss | |
| 6,289,149 B1 | 9/2001 | Druy et al. | |
| 6,657,723 B2 * | 12/2003 | Cohen et al. | 356/328 |
| 6,839,135 B2 * | 1/2005 | Hamm et al. | 356/328 |
| 6,904,205 B2 * | 6/2005 | Berolo et al. | 385/37 |
| 7,034,935 B1 * | 4/2006 | Kruzelecky | 356/328 |

\* cited by examiner

*Primary Examiner*—L. G Lauchman
(74) *Attorney, Agent, or Firm*—Iandiorio Teska & Coleman

(57) ABSTRACT

A spectroanalytical system for receiving radiation to be analyzed along a first path includes a grating in the first path with periodic faceted grooves for spatially separating the radiation as a function of wavelength. The blaze angles of the faceted grooves are progressively graded. A multielement detector detects radiation spatially separated by the grating. An optical conditioner is disposed in the first path between the grating and a multielement detector.

36 Claims, 11 Drawing Sheets

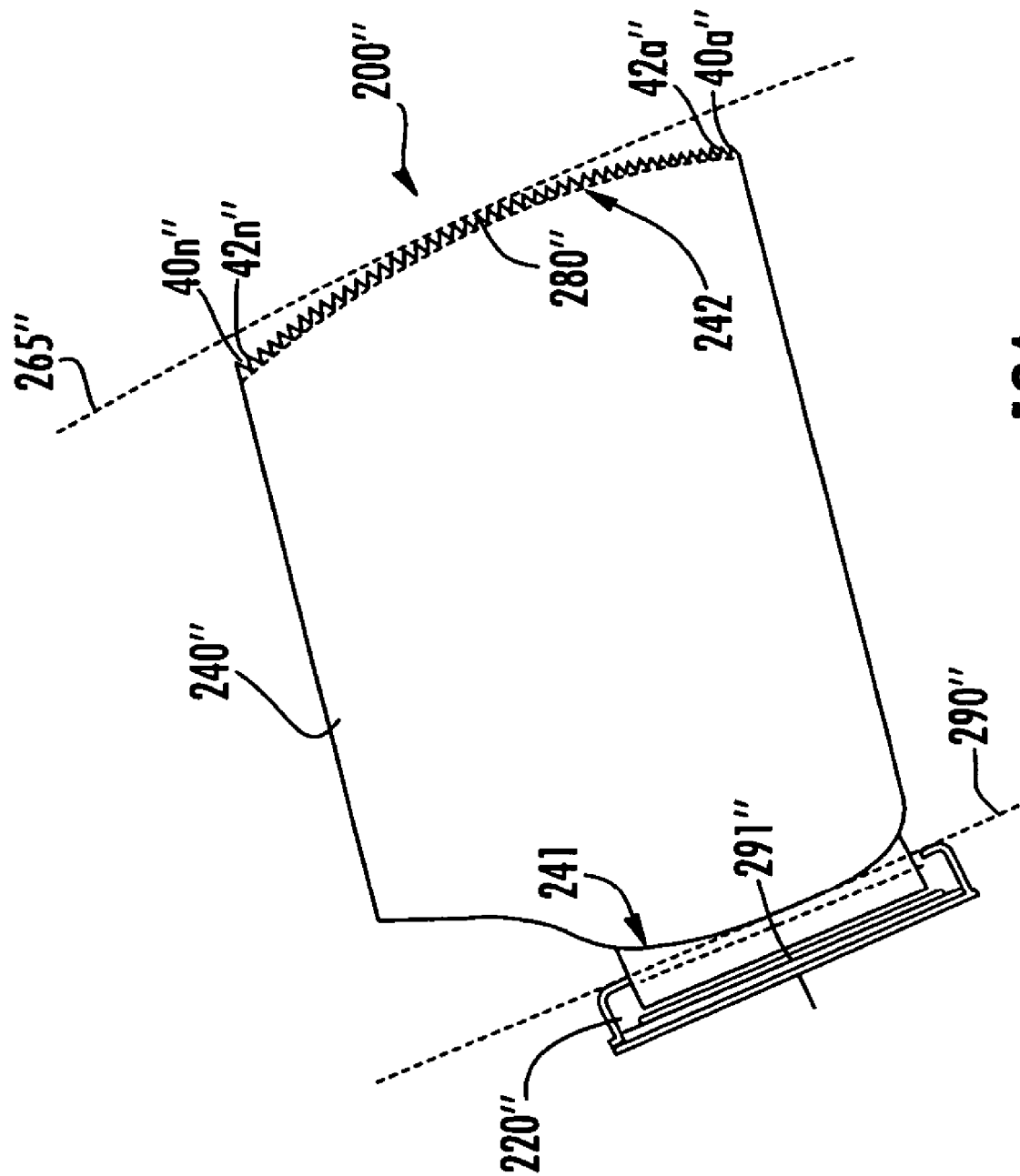

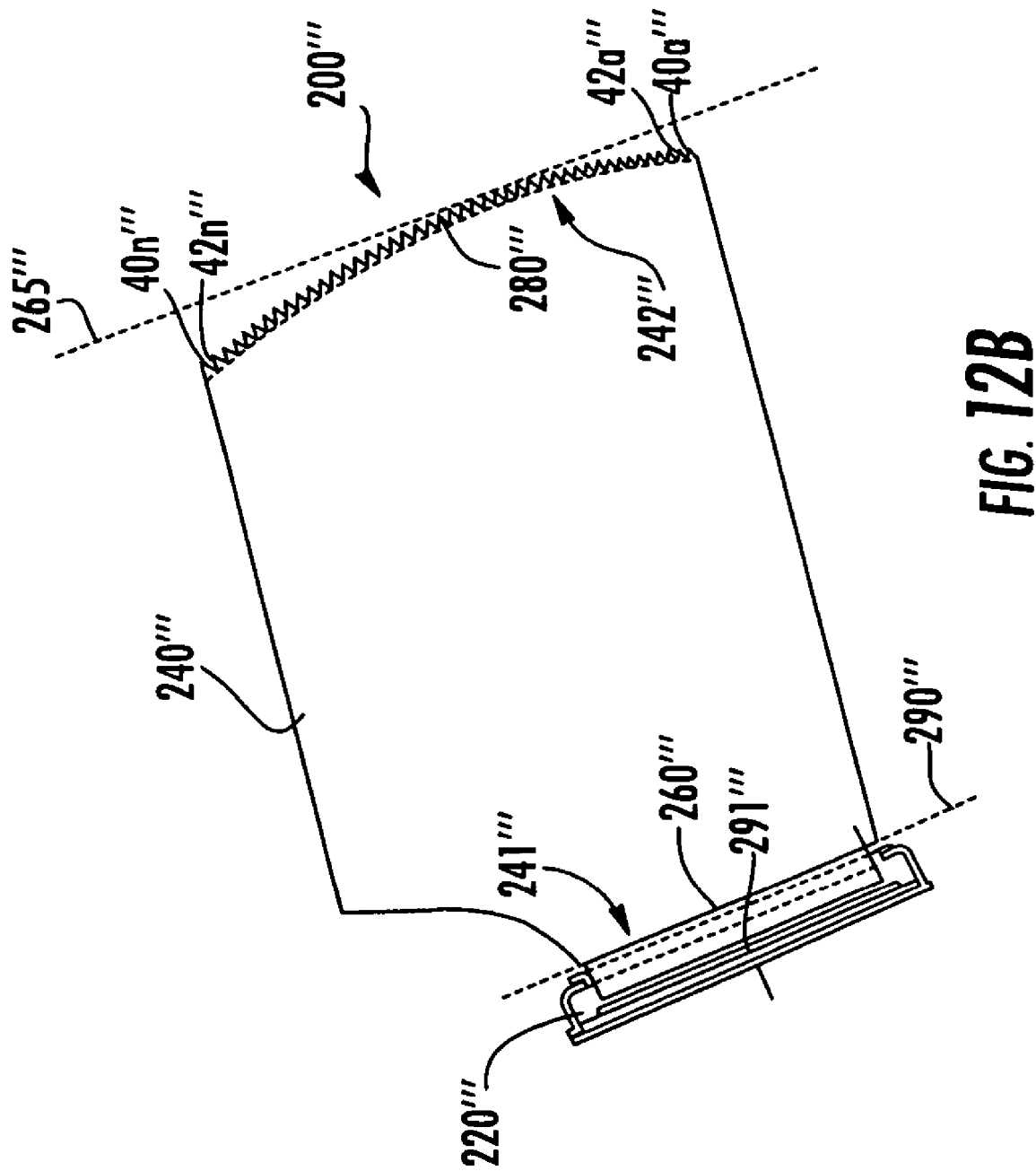

ARRAY DETECTOR COUPLED SPECTROANALYTICAL SYSTEM AND GRADED BLAZE ANGLE GRATING

GOVERNMENT RIGHTS

This invention was made with U.S. Government support under Contract No. DADD13-99-M-0042 awarded by the U.S. Army. The Government may have certain rights in the subject invention.

FIELD OF THE INVENTION

This invention relates to a graded blaze angle grating resulting higher diffraction efficiency over the spectral region of interest. This invention also relates to a spectroanalytical system including a wedge-like optical conditioner structure capable of coupling to an array detector including a flat array detector.

BACKGROUND OF THE INVENTION

Spectroscopy is often used in the analysis of materials. Typically, the analysis involves transmitting radiation of a range of frequencies through gaseous, liquid, or solid material samples. The materials to be tested include dairy products or engine lubricants to determine contamination, anesthesia gases for monitoring, chemical and pharmaceutical process monitoring, and the like.

Prior art spectroanalytical systems include an entrance aperture defining structure or sample cell for receiving radiation to be analyzed, a dispersion structure or reflective grating for separating the received radiation as a function of wavelength, output optical fibers connected to a detector structure or assembly for detecting specific portions of the dispersed radiation, and a wedge-like optical conditioner structure between the entrance aperture defining structure and the dispersion structure for radiation as a function of wavelength. See U.S. Pat. Nos. 5,856,870 and 6,289,149 incorporated herein by this reference.

In the embodiments disclosed in U.S. Pat. No. 5,856,870, the optical fibers have a high numerical aperture as found in chalcogenide glasses such as arsenic sulfide or arsenic germanium selenide, and heavy metal fluoride glasses such as a mixture of zirconium, barium, lanthanum, and aluminum fluorides, or polycrystalline or single crystal material such a thallium bromoiodide or cesium iodide. The term "numerical aperture" (NA) is the sine of the vertex angle of the largest cone of meridional rays that can enter the system. It is frequently used as a measure of light gathering power.

At intermediate numerical apertures, 0.15-0.35, systems using concave gratings with curved grooves of varying spacing or a concave grating combined with a conical reflective grating or mirror may be used to reduce astigmatism successfully. However, at large numerical apertures, 0.4 to 0.7, which are more compatible with the high numerical aperture optical fibers described above, these approaches fail to deliver the desired efficiency and resolution, especially systems immersed in a low refractive index medium such as a gas.

The prior art design based on an optical "wedge" conditioner enables high numerical aperture (NA>0.7) radiation to be "straightened out" so that it becomes more perpendicular to the grooves of a cylindrical reflection diffraction grating. With a wedge optical conditioner, radiation from the source is increasingly "collimated" or made more parallel to the center plane of the wedge as the wedge angle is initially increased. Thus, the variation in the angle of diffraction caused by radiation oblique to the grating grooves is reduced. The reflected, diffracted radiation is then guided back to the focal surface and the reverse effect restores the radiation to its original high angle condition (high NA), thus preserving the high optical throughput of that system. The prior art system, as well as other known systems, uses point detectors to pick off the diffracted radiation from the focal surface.

While the prior art system including the wedge-like optical conditioner offers many advantages, it does present some limitations as well. Optical fibers and discrete detectors are not always desirable because a system including these elements is "fixed" at the wavelengths where the fibers and detectors are located. With the prior art system described, for each test or analysis that seeks to detect a different chemical substance, for example, the point detectors must be placed in a new arrangement characteristic of the expected wavelengths for that particular chemical substance. Thus, the prior art system lacks versatility in terms of wavelength selection flexibility and the ability to use a large number of detectors.

The use of an array detector would provide additional versatility to the wedge-like optical conditioner structure of the prior art that includes a focal end surface that is curved to approximate the Rowland Circle in order to focus the spatially separated wavelengths onto the fibers leading to the detectors. Use of an array presents a couple of problems. Array detectors are generally available for planar focal surfaces, not for curved focal surfaces. Secondly, array detectors in the infrared are generally thermal detectors, and thermal detector elements cannot contact the conditioner or any thermally conductive filler material between the conditioner and the elements. A thermal detector element in thermal contact with the conditioner would be influenced more by the temperature of the conditioner and less by the infrared radiation emitted from the conditioner.

Furthermore, while in principle it would be possible to design lens or mirror optics to couple the output from the conditioner to, for example, a flat array detector, the optics required to do so would be difficult to fabricate, bulky and expensive.

Known concave grating configurations which produce relatively flat focal fields often require the detector array to be at an appreciable angle with respect to the direction of the diffracted radiation coming from the grating vertex. While this presents little challenge if the optical medium is air, it becomes a problem for high refractive index medium such as zinc selenide (ZnSe), where the rays exiting into gas or vacuum undergo significant refraction and even total internal reflection. FIGS. 1-4 demonstrate the refraction of a converging cone of rays exiting a high index medium (i.e. Zinc Selenide) into a low index medium (i.e. air or vacuum). In each case, the angular distribution of rays is within ±16° of the center ray (the chief ray). It is clear that the largest angle of incidence allowed for the chief ray is less than about 7.5°. In FIG. 1, light rays 12 exit conditioner 14 at exit surface 16 and reach detector plane/focal surface 18 at detector point 20. Angle θ is at 0° where chief ray 24 is perpendicular to exit surface 16 (FIG. 1). FIG. 2 shows chief ray 24 with angle θ at a 5° angle of incidence; FIG. 3 shows chief ray 24 with angle θ at a 7.5° angle of incidence; and FIG. 4 shows chief ray 24 with angle θ at a 10° angle of incidence. Thus, the largest angle of incidence allowed for the chief ray is less than about 7.5° in order for light rays 12 to remain tightly clustered on focal surface 18. At 10° the clustering is significantly degraded as shown in FIG. 4. Therefore, it can be seen that having the exit surface at an appreciable angle with respect to the diffracted radiation coming from the grating vertex presents the undesirable refraction effects shown in FIGS. 2-4, with the most significant degradation shown in FIG. 4. Notably, rays of all wavelengths strike all parts of the grating. Consequently, for a particular wavelength, rays from all parts of the grating will cluster around the chief ray for that wavelength at the focal surface. Typically, the grating subtends an angle of about 33° from a point on the focal surface. Consequently, the rays approach the focal surface at the angle of the chief ray ±17°.

To better understand the significance of the conditioner exit surface curvature, it is helpful to consider three different conditioner exit surface radii: 1) flat; 2) equal to the radius of the grating; and 3) equal to half the radius of the grating (the radius of the Rowland circle).

In the case of a flat exit surface, for wavelengths lying on either side of the exit surface vertex, increasing the distance from the vertex both increases the angle of incidence of the chief ray and refracts the rays away from the vertex normal. For the surface radius equal to the grating radius, the chief ray is normal to the exit surface for all wavelengths. For the case of half the grating radius (the Rowland circle), the angle of incidence of chief rays for wavelengths lying on either side of the exit surface vertex increases with distance from the vertex, but the rays are refracted increasingly toward the vertex normal. For thermal detectors, a gap is required between the exit surface of the conditioner and the detector elements. In vacuum the required gap is much smaller than in air. Increasing the size of the gap increases detector responsivity but requires shortening the distance from the exit surface to be closer to the grating in order to maintain focus on the detector. A compromise must be made among a) focus on the detector, b) intensity getting to the detector, and c) the detector responsivity. If curved detector arrays were presently available, the choice would be a radius between that of cases 2 and 3. With a flat detector array, for example, the useful length of the array is limited to about 25% of the grating radius. At that length the sag is 0.016 of the grating radius. A flat exit surface on the conditioner gives the chief ray angles of incidence on the exit surface of ±14°. For longer arrays, it is very difficult to find a useful compromise among focus, intensity and responsivity.

Prior art reflective concave gratings, including the grating disclosed in U.S. Pat. No. 5,856,870, typically have a fixed blaze angle which is optimized for the center wavelength of a spectral region of interest. The blaze angle is chosen to maximize the diffraction efficiency for designated wavelengths. For a fixed blaze angle chosen to maximize the efficiency near the grating vertex, the efficiency falls off away from the vertex as the surface normal deviates increasingly from the vertex normal. A blaze angle deviating only 5° from the angle for maximum efficiency may drop the efficiency by half. The other half is directed into other diffraction orders. With a large numerical aperture system the grating may have an arc length of 34° or ±17° from the vertex. To keep the grating efficiency above 70% of peak efficiency, the blaze angle is preferably less than 3° from the blaze angle for highest efficiency.

A configuration of the conditioner having the entrance slit and the exit surface near or on the focal surface with the vertex normal of the exit surface vertex lying on the same line as the vertex normal of the grating minimizes the refracted angles of the exiting light.

SUMMARY OF THE INVENTION

It is therefore an object of this invention to provide an improved, more efficient spectroanalytical system for the analysis of materials.

It is a further object of this invention to provide a graded or varying blaze angle grating to minimize deviation from the local blaze angle at the grating vertex.

It is a further object of this invention to provide such an improved spectroanalytical system in which radiation exiting the wedge conditioner and entering the array detector has maximum intensity.

It is a further object of this invention to provide such an improved spectroanalytical system which provides higher radiation diffraction efficiency over a spectral region of interest.

It is a further object of this invention to provide such an improved spectroanalytical system which enables coupling an optical wedge conditioner to a flat array detector thus providing added versatility.

The invention results from the realization that a more versatile spectroanalytic system with better intensity for analyzing materials is achieved by grading the blaze angles of the grating, and by providing an optical wedge conditioner having an exit surface such that the tangent at the exit surface vertex is parallel or substantially parallel to the tangent at the vertex of the reflective grating to accommodate, for example, a flat array detector.

This invention features a spectroanalytical system for receiving radiation to be analyzed along a first path, the system including a grating in the first path having periodic faceted grooves for spatially separating the radiation as a function of wavelength in which blaze angles of the faceted grooves are progressively graded, a multielement detector for detecting radiation spatially separated by the grating, and an optical conditioner disposed in the first path between the grating and the multielement detector. The grating may be divided into multiple zones, the blaze angle of each zone being different. There may be more than two zones, and there may be at least four zones. The blaze angle of each zone may be selected to maximize intensity of the spatially separated radiation at an exit surface of the optical conditioner. The blaze angle with respect to the surface normal of each zone may be within ±3° of the vertex blaze angle. The angle of the grating groove facets to the grating vertex normal may vary progressively. The grating may be concave, the optical conditioner may have a convex surface, and the concave grating optically coupled to the convex surface of the optical conditioner. The grating may be reflective. Filler glass may optically couple the concave grating to the convex grating surface of the optical conditioner.

This invention also features a spectroanalytical system for receiving radiation to be analyzed along a first path, the system including a grating in the first path having periodic faceted grooves for spatially separating the radiation as a function of wavelength, a multielement detector for detecting radiation spatially separated by the grating, and an optical conditioner disposed in the first path between the grating and the multielement detector, the optical conditioner having a tangent to the vertex of an exit surface parallel or substantially parallel to a tangent at the vertex of the grating to minimize angles of incidence of the spatially separated radiation on the exit surface of the optical conditioner. The conditioner exit surface may be flat. The system may further include a sample cell optically coupled to the optical conditioner. The sample cell may be optically coupled to the optical conditioner by a compound parabolic concentrator. The multielement detector may be physically separated from but optically coupled to the exit surface of the optical conditioner. The multielement detector may be a flat detector array. The optical conditioner may have a flat entrance surface along the first path.

The flat array detector may intersect a curved focal surface defined by the grating and conditioner at two points. The flat entrance surface may intersect the Rowland Circle defined by the grating. The optical conditioner may be wedge-like, and the wedge-like optical conditioner may have a taper between 0.3° and 2.0°. The optical conditioner may be made of a material having an index of retraction of at least 2.0. The optical conditioner may be made of high refractive index glass, and it may be made of zinc selenide.

This invention further features a spectroanalytical system for receiving radiation to be analyzed along a first path, the system including a grating in the first path having periodic faceted grooves for spatially separating the radiation as a function of wavelength in which blaze angles of the faceted grooves are progressively graded, a multielement detector for detecting radiation spatially separated by the grating, and an optical conditioner disposed in the first path between the grating and the multielement detector, the optical conditioner having a tangent to vertex of an exit surface parallel or substantially parallel to a tangent at the vertex of the grating to minimize angles of incidence of the spatially separated radiation on the exit surface of the optical conditioner.

The multielement detector may be physically separated from but optically coupled to the exit surface of the optical conditioner diametrically opposite the vertex of the grating to maximize throughput.

This invention also features a spectroanalytical system for receiving radiation to be analyzed along a first path, the system including an optical conditioner disposed in the first path and having a proximal edge and a distal edge, the optical conditioner further including a grating on the distal edge having periodic faceted grooves for spatially separating the radiation as a function of wavelength in which blaze angles of the faceted grooves are progressively graded, and a multielement detector proximate the proximal edge of the optical conditioner for detecting radiation spatially separated by the grating.

This invention further features a spectroanalytical system for receiving radiation to be analyzed along a first path, the system including an optical conditioner disposed in the first path having periodic faceted grooves for spatially separating the radiation as a function of wavelength on its distal edge, the optical conditioner also having a tangent to the vertex of an exit surface parallel or substantially parallel to the tangent at the vertex of the grating on its proximal edge to minimize angles of incidence of the spatially separated radiation on the exit surface, and a multielement detector for detecting radiation spatially separated by the grating wherein the multielement detector is optically coupled to the exit surface of the optical conditioner diametrically opposite the vertex of the grating to maximize throughput.

This invention also features a spectroanalytical system for receiving radiation to be analyzed along a first path, the system including an optical conditioner disposed in the first path having a proximal edge and a distal edge. The optical conditioner includes a grating on the distal edge having periodic faceted grooves for spatially separating the radiation as a function of wavelength in which the blaze angles of the faceted grooves are progressively graded, and a flat exit surface parallel or substantially parallel to the tangent at the vertex of the grating on the proximal edge to minimize angles of incidence of the spatially separated radiation on the flat exit surface. A multielement detector detects radiation spatially separated by the grating wherein the multielement detector is optically coupled to the flat exit surface of the optical conditioner diametrically opposite the vertex of the grating to maximize throughput.

This invention further features a spectroanalytical system for receiving radiation to be analyzed along a first path, the system including a grating in the first path for spatially separating the radiation as a function of wavelength, the grating including progressively graded groove facet angles, a multielement detector for detecting radiation spatially separated by the grating, and an optical conditioner disposed in the first path between the grating and the multielement detector, the optical conditioner having a flat exit surface, wherein the multielement detector is optically coupled to the flat exit surface of the optical conditioner.

This invention also features a spectroanalytical system for receiving radiation to be analyzed along a first path, the system including a grating in the first path for spatially separating the radiation as a function of wavelength, the grating including progressively graded groove facet angles, a detector subsystem for detecting radiation spatially separated by the grating, and an optical conditioner disposed in the first path between the grating and the detector subsystem. The optical conditioner may have a flat exit surface parallel or substantially parallel to the tangent at the vertex of the grating to minimize angles of incidence of the spatially separated radiation on the flat exit surface of the optical conditioner. The detector subsystem may be a flat detector array optically coupled to the flat exit surface of the optical conditioner diametrically opposite the vertex of the grating to maximize throughput.

This invention further features a spectroanalytical system for receiving radiation to be analyzed along a first path, the system including a grating having faceted grooves in the first path for spatially separating the radiation as a function of wavelength in which blaze angles of the grooved facets of the grating are progressively graded, a multielement detector for detecting radiation spatially separated by the grating, an optical conditioner disposed in the first path between the grating and the multielement detector, the optical conditioner including a tangent to the vertex of an exit surface parallel or substantially parallel to a tangent at the vertex of the grating to minimize angles of incidence of the spatially separated radiation on the exit surface of the optical conditioner, wherein the multielement detector is optically coupled to the exit surface of the optical conditioner diametrically opposite the vertex of the grating to maximize throughput, and a sample cell optically coupled to the optical conditioner by a compound parabolic concentrator.

BRIEF DESCRIPTION OF THE DRAWINGS

Other objects, features and advantages will occur to those skilled in the art from the following description of a preferred embodiment and the accompanying drawings, in which:

FIG. 12A is a schematic top view of the optical conditioner with a grating integral with and part of the optical conditioner; and FIG. 12B is a schematic top view of the optical conditioner with a grating integral with and part of the optical conditioner where the optical conditioner includes a flat exit surface.

DISCLOSURE OF THE PREFERRED EMBODIMENT

Figure 1:
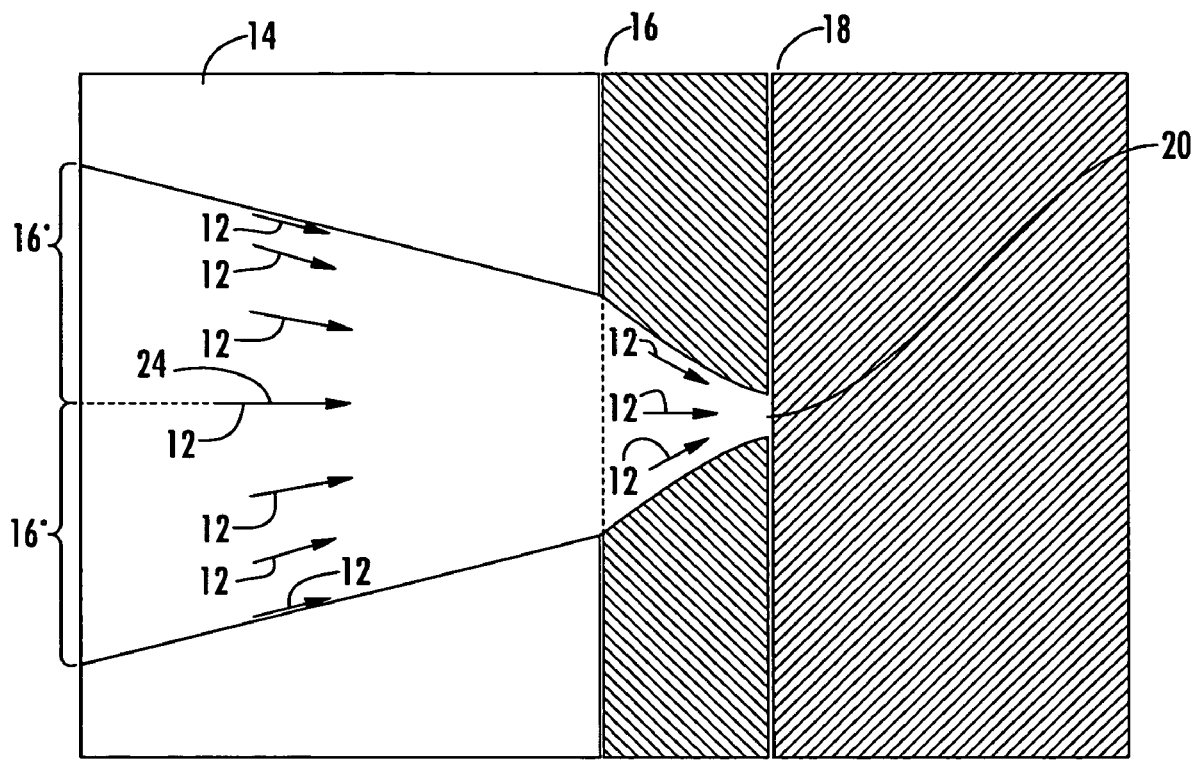
FIG. 1 is a schematic cross-sectional view of light rays passing through and out of a wedge-like optical conditioner showing the light rays in relation to the exit surface where the chief ray is normal to the exit surface.
Figure 2:
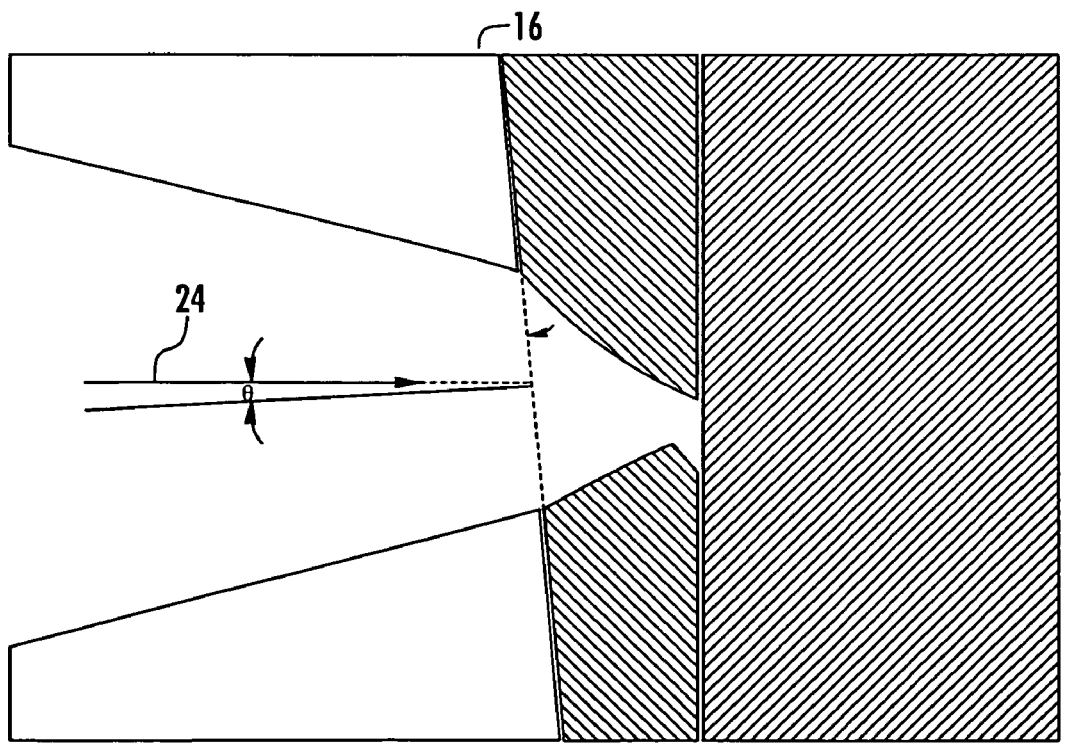
FIG. 2 is another schematic cross-sectional view of light rays passing through and out of a wedge-like optical conditioner showing the light rays in relation to the exit surface where the chief ray is at a 5° angle of incidence.
Figure 3:
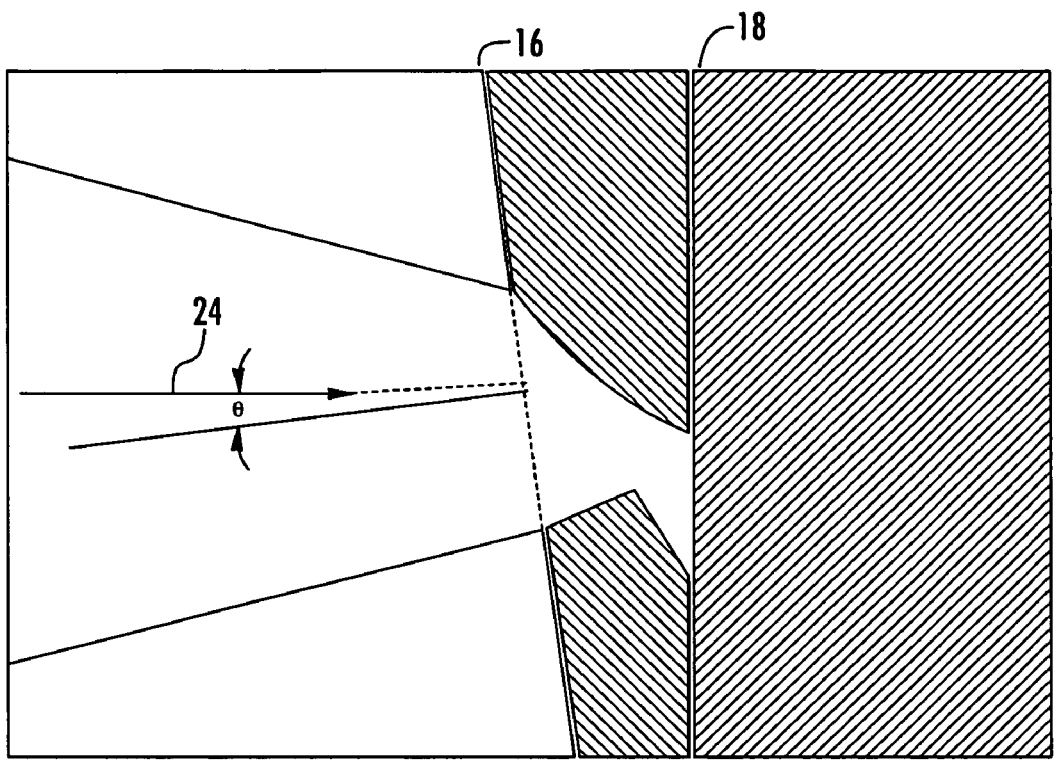
FIG. 3 is another schematic cross-sectional view of light rays passing through and out of a wedge-like optical conditioner showing the light rays in relation to the exit surface where the chief ray is at a 7.5° angle of incidence.
Figure 4:
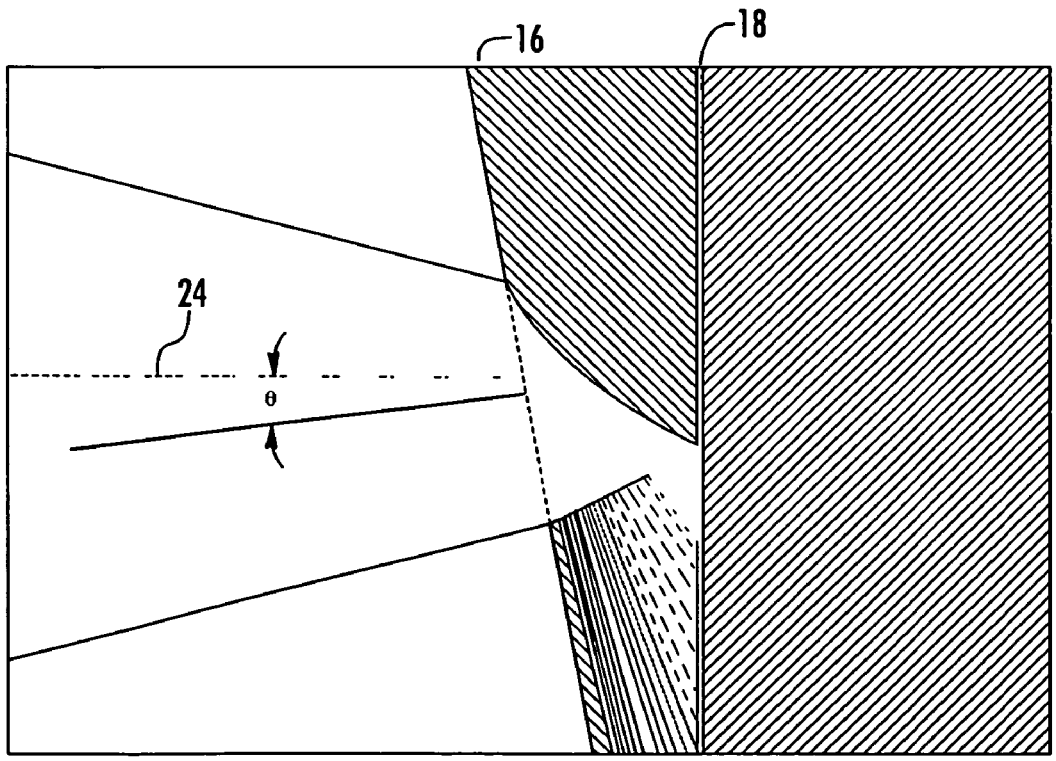
FIG. 4 is another schematic cross-sectional view of light rays passing through and out of a wedge-like optical conditioner showing the light rays in relation to the exit surface where the chief ray is at a 10° angle of incidence.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 5:
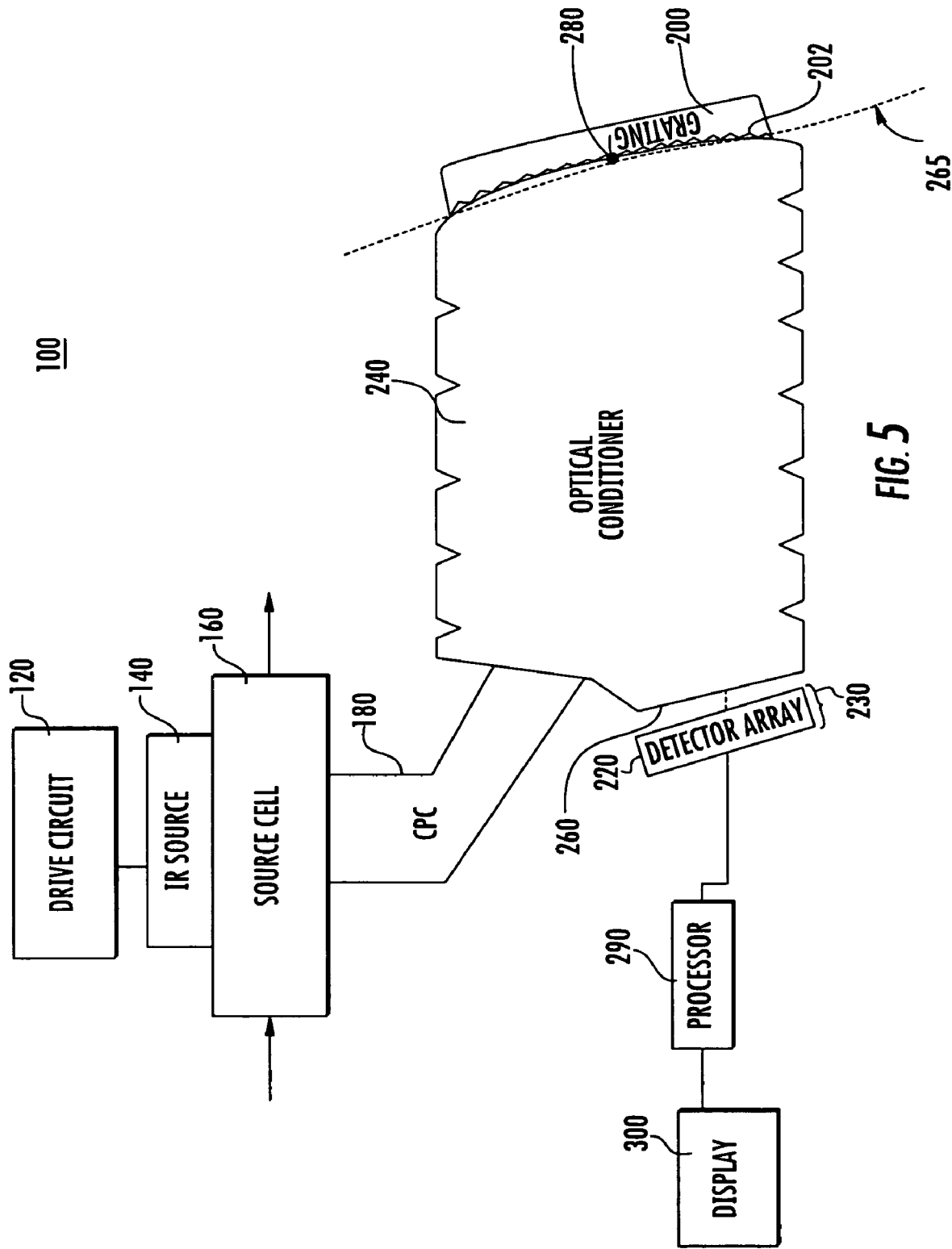
FIG. 5 is a schematic view of a spectroanalytical system in accordance with the present invention.

Array detector coupled spectroanalytical system 100, FIG. 5 typically includes drive circuit 120 for pulsing a beam of radiation from infrared radiation source 140. The beam of radiation passes through sample cell 160. In a preferred embodiment, sample cell 160 includes compound parabolic concentrator 180 as disclosed in U.S. Pat. No. 6,289,149. As described in U.S. Pat. No. 6,289,149, a sample for analysis is circulated through sample cell 160. Sample cell 160 may also be an analytical chamber formed between optically transparent plates as disclosed in U.S. Pat. No. 5,856,870.

System 100, in accordance with the present invention, receives radiation to be analyzed along a first path and includes grating 200 having periodic faceted grooves 202 in the first path for spatially separating the radiation as a function of wavelength, and multi-element detector 220 for detecting radiation as a function of wavelength. The radiation received is typically infrared radiation.

System 100 further includes optical conditioner 240 disposed in the first path between grating 200 and multi-element detector 220. In one embodiment for use with flat detector arrays, optical conditioner 240 has flat exit surface 260 parallel or substantially parallel to tangent 265 of vertex 280 of grating 200 to minimize the angles of incidence of the spatially separated radiation on flat exit surface 260. Vertex 280 is defined as the optical center of grating 200 and is not necessarily the physical center of grating 200. Spatially separated radiation 250 is shown in highly schematic form in FIG. 6.

In one example, multi-element detector 220, FIG. 5 is physically separated but optically coupled to flat exit surface 260 of optical conditioner 240 diametrically opposite vertex 280 of grating 200 in order to maximize throughput. The phrase optically coupled as used herein means that a first structure is optically aligned with, and/or has an optical interface with, a second structure. Detector array 220 can then be coupled to appropriate output apparatus such as data processor 290 and display 300. Sample cell 160 is optically coupled to optical conditioner 240, in one example by compound parabolic concentrator 180.

Figure 6:
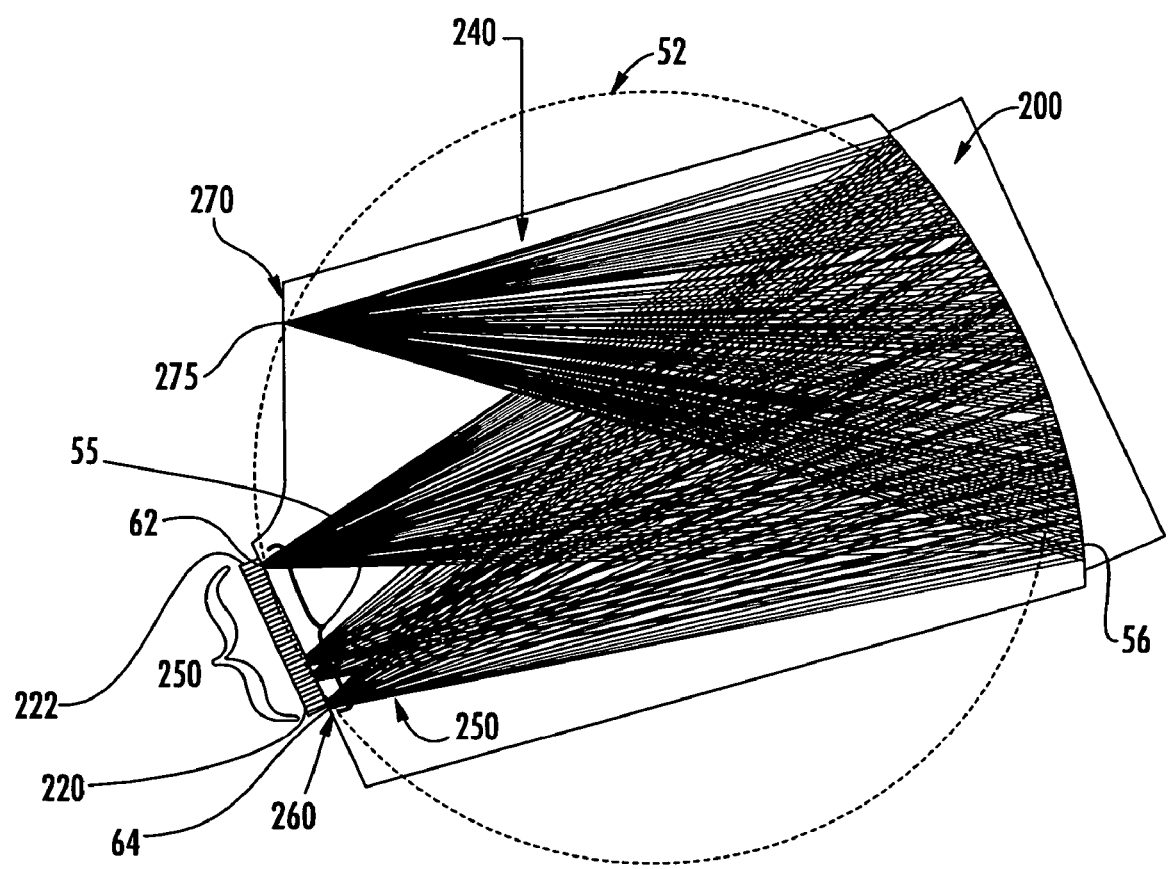
FIG. 6 is a schematic view of an optical ray trace for the optical wedge conditioner having a flat exit surface in accordance with the present invention.
Figure 7:
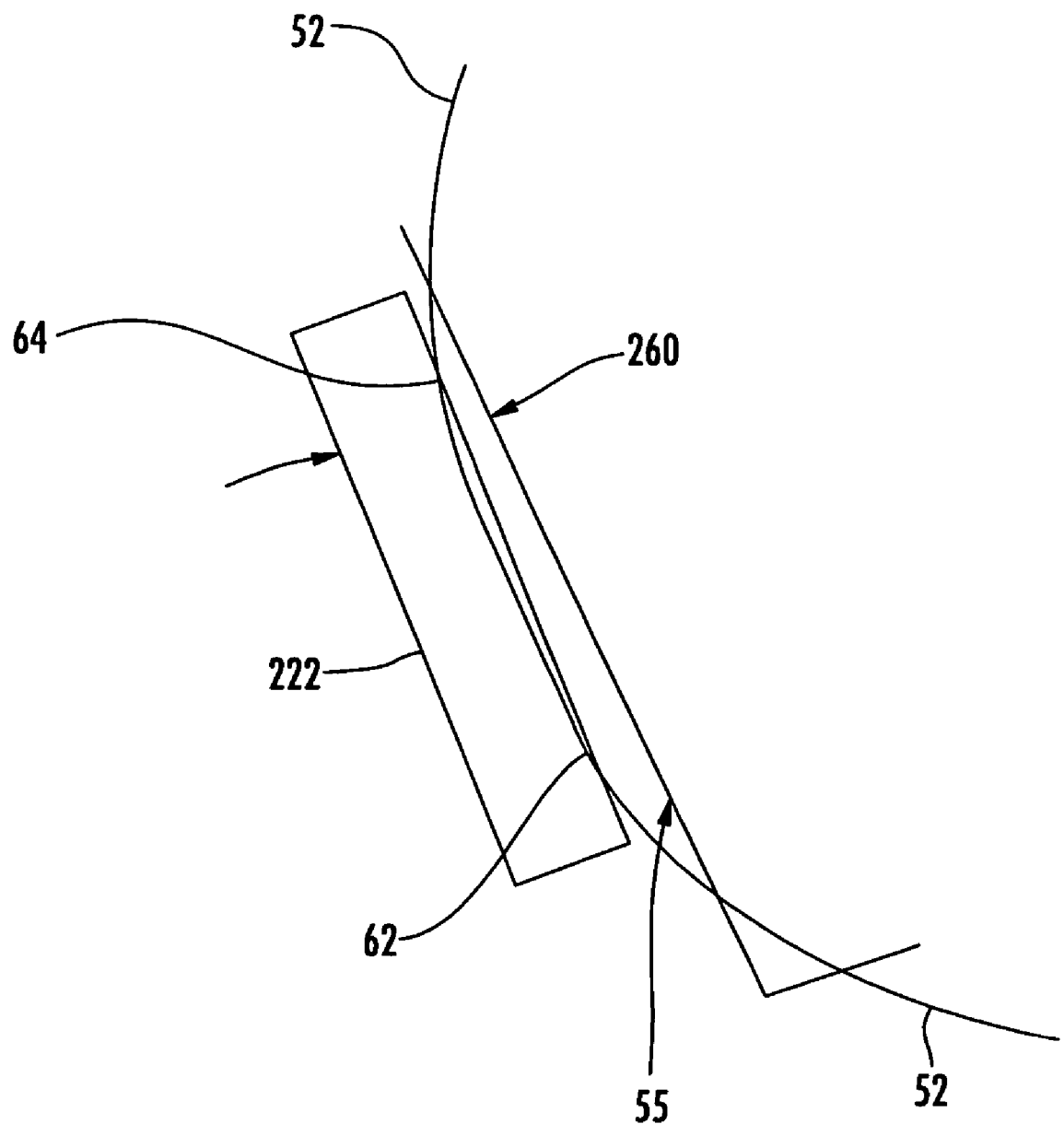
FIG. 7 is a schematic enlarged view of the points of intersection of a flat detector array with the focal surface on the Rowland Circle.

In one embodiment, multi-element detector 220, FIG. 6 is flat detector array 222 and is spaced from flat exit surface 260 of optical conditioner 240 at a distance of approximately 0.25 mm to minimize detection of the temperature of optical conditioner 240 by thermal conduction. Most of exit surface 260 of optical conditioner 240 lies inside the Rowland Circle 52 defined by grating 200. Optical conditioner 240 may have a flat entrance surface 270 along the first path which typically intersects the Rowland Circle 52 defined by grating 200. The entrance for the incoming light can be a point 275. Flat detector array 222 intersects focal surface 55 at two points 62, 64. Notably, most of focal surface 55 lies outside exit surface 260 as shown in FIG. 7, and has a curvature different from Rowland Circle 52.

In one example, grating 200, FIG. 6 is concave and reflective, optical conditioner 240 is wedge-like and has convex surface 56, and grating 200 is optically coupled to convex surface 56 of optical conditioner 240. Wedge-like optical conditioner 240 is preferably made of material having an index of refraction of at least 2.0, such as zinc selenide, or of high refractive index glass, and typically has a taper between 0.3° and 2.0°.

Figure 8:
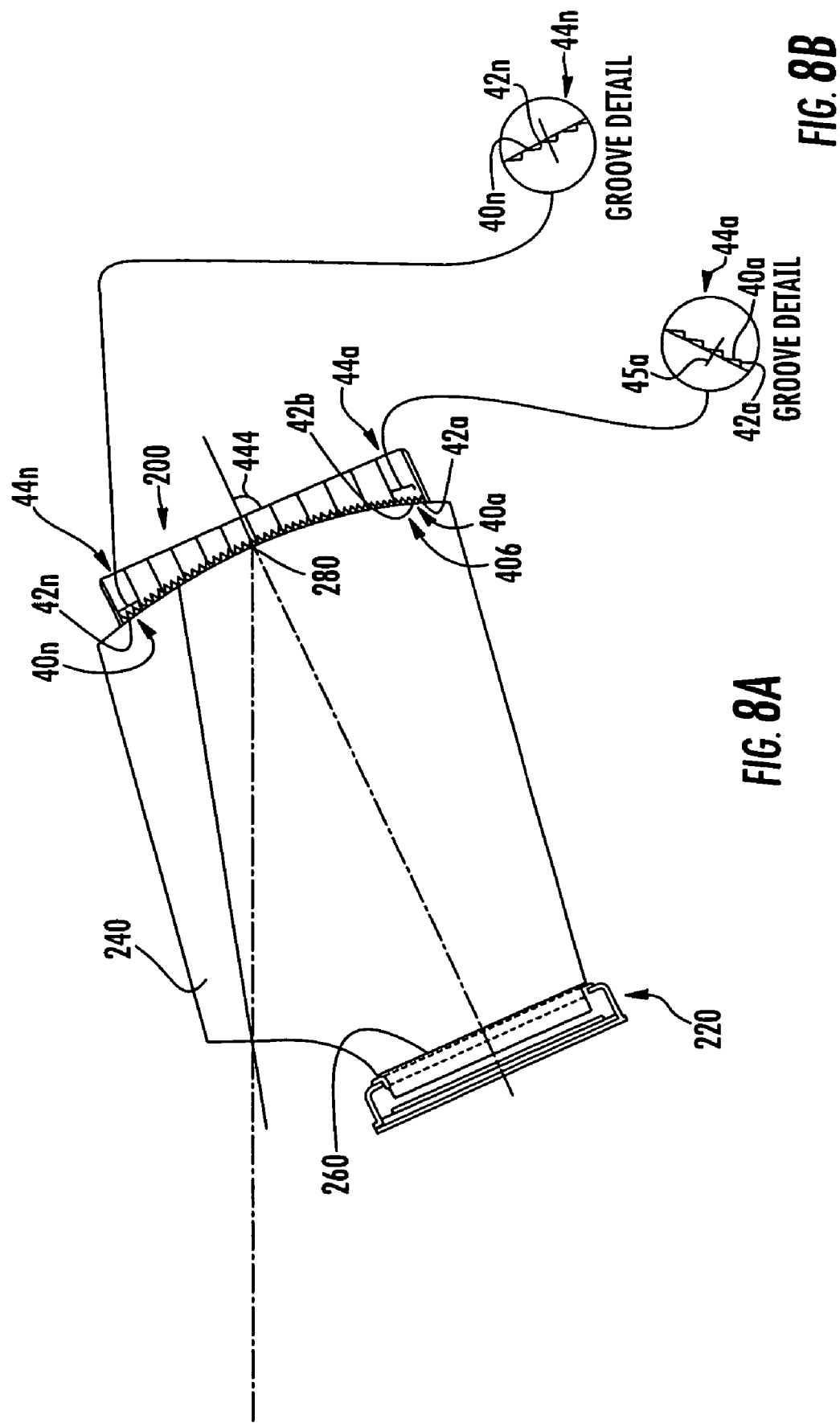
FIG. 8A is a schematic view of the graded blaze angle grating in accordance with the present invention.
FIG. 8B is a schematic enlarged view of the blaze angle of two zones of FIG. 8A.

One preferred embodiment, which may be used with a multielement detector 220 that may be a flat detector array or a curved detector array when the capability exists to manufacture such a curved detector array, grating 200, FIG. 8A is in the first path having periodic faceted grooves 40$a$ ... 40$n$ for spatially separating the radiation as a function of wavelength. Grating blaze angles are usually defined as the angle between the groove facet normal and the grating vertex normal. What is physically significant is the local blaze angle, the angle between the facet normal and the surface normal at the facet location. With a flat grating these are identical, but with a deeply curved grating the difference can be large. For a fixed blaze angle grating, the angle of the faceted grooves of the grating may differ from the vertex blaze angle as much as 15°. In contrast, blaze angles 42$a$ ... 42$n$ of faceted grooves 40$a$ ... 40$n$ in accordance with the present invention are progressively varied or graded to minimize the deviation from the local blaze angle at grating vertex 280. The present invention reduces the local blaze angle deviation by progressively grading the blaze angles of the faceted groves from one end to the other of grating 200, or for ease of manufacturability, dividing the ruled surface into zones having different blaze angles. Grating 200 can thus be divided into multiple zones 44$a$ ... 44$n$, FIG. 8A with blaze angles 42$a$ ... 42$n$ of each zone being different, and the blaze angle of each zone may be selected to minimize deviation from the local blaze angle at grating vertex 280. Preferably, there are more than two zones 44$a$ ... 44$n$ and at least four zones 44$a$ ... 44$n$, FIG. 8A. The blaze angles of zones 44$a$ and 44$n$ are shown in schematic enlarged form in FIG. 8B, thus showing an example of the difference in blaze angles between zones.

Figure 9:
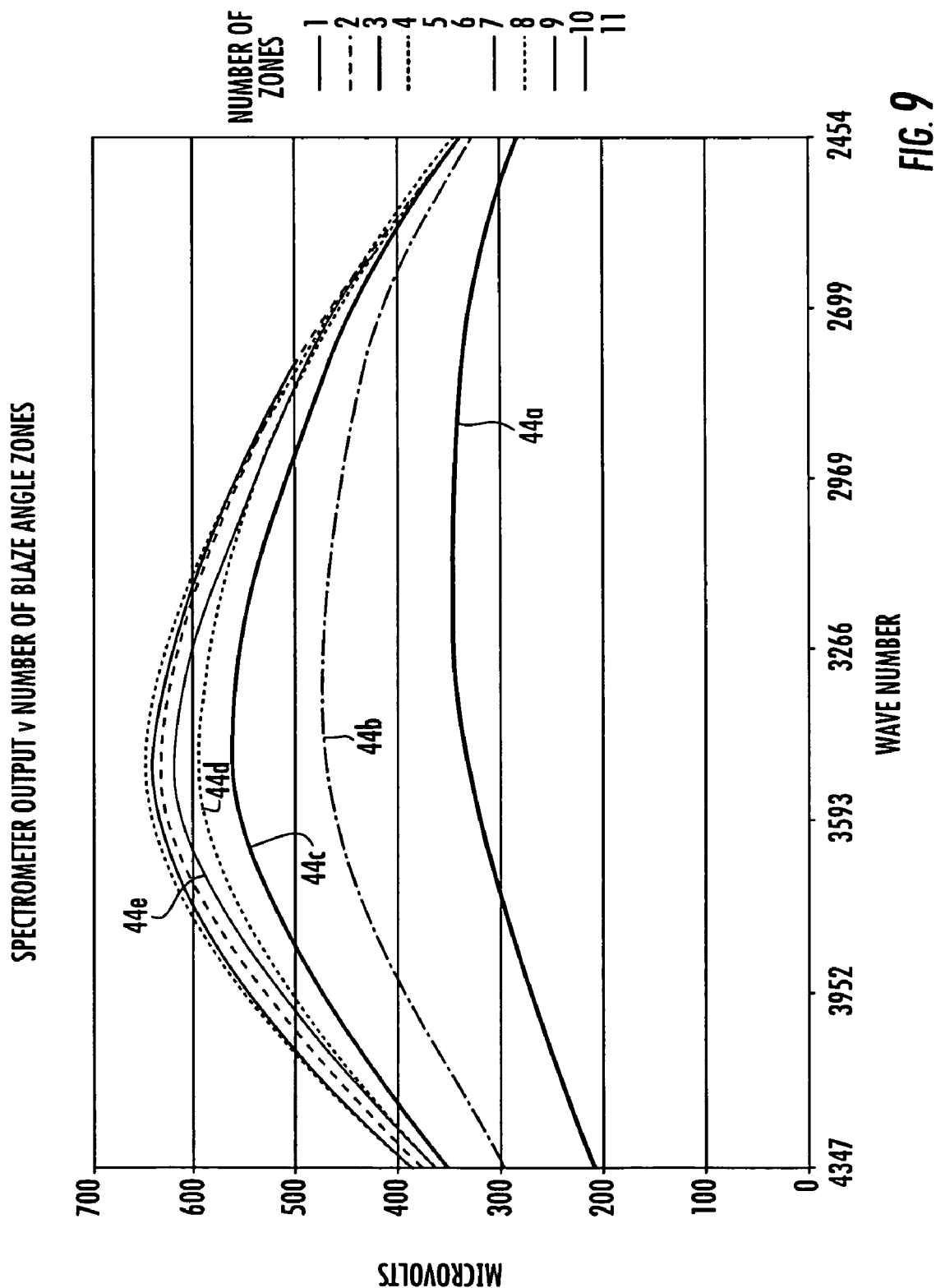
FIG. 9 is a graph comparing spectrometer outputs for a typical non-graded blaze angle blaze grating (one zone) with graded blaze angle gratings having multiple zones with blaze angles progressively changing in accordance with the present invention.

Blaze angles 42a . . . 42n, FIG. 8A with respect to surface normal 45a . . . 45n FIG. 8B is varied such that each zone 44a . . . 44n may be within +/−3° of vertex blaze angle 444. For ease of manufacturability periodic increments over 5-7 zones may be considered. In one embodiment, with the practical limitations as noted above, the angles of the faceted grooves 40a . . . 40n vary, although each faceted groove angle may be unique. As shown in FIG. 9, as the number of zones increases beyond four zones 44e, the increases in spectrometer output become less pronounced as compared to increases from one zone 44a to four zones 44e.

Figure 10:
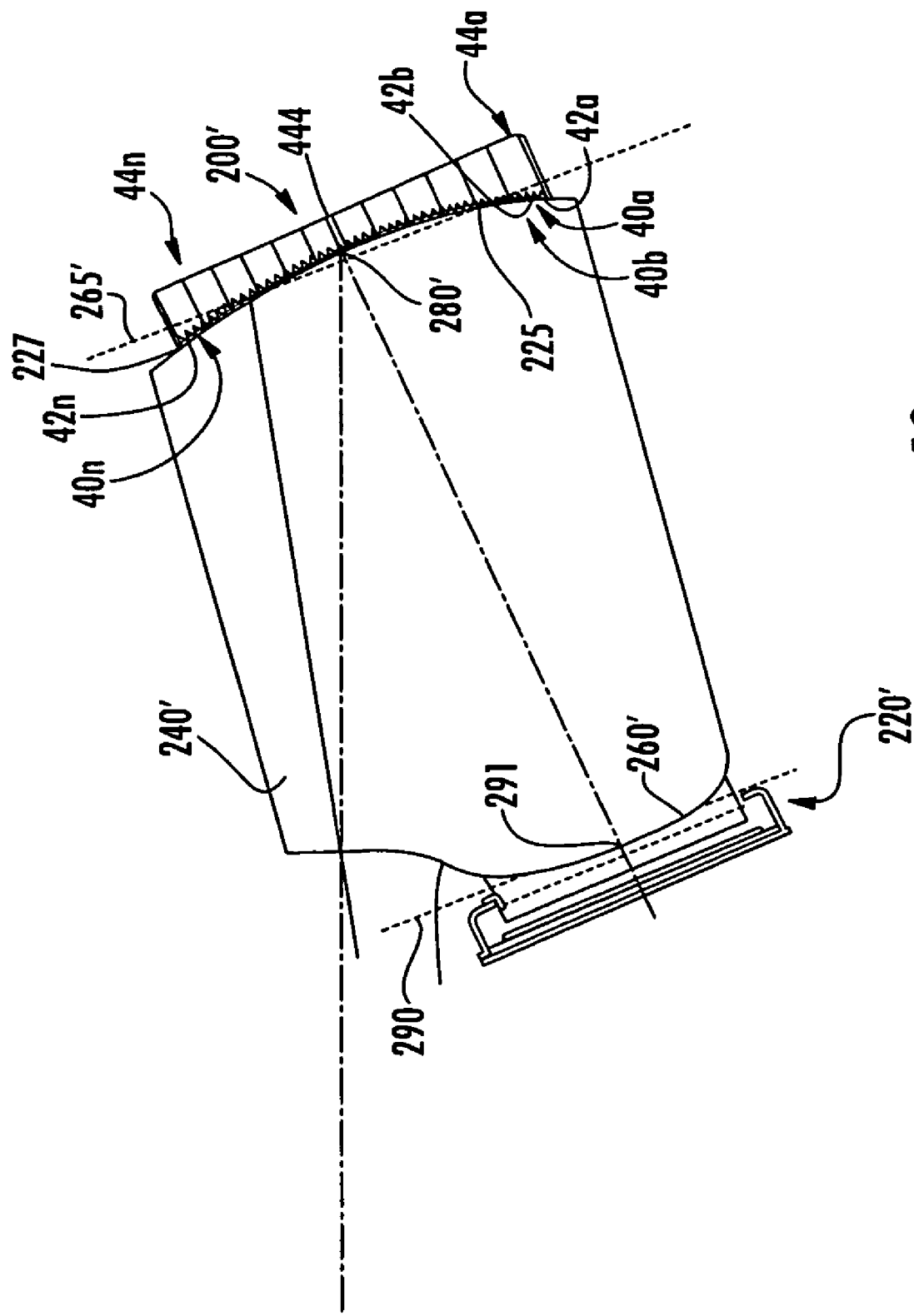
FIG. 10 is a schematic view of the graded blaze angle grating in accordance with the present invention coupled to a curved detector array.

Multielement detector 220, FIG. 8A, which may be a flat detector array (or a curved detector) is included for detecting radiation spatially separated by the grating. In one embodiment, detector array 220', FIG. 10 is curved, and exit surface 260' is curved. The tangent 290 at exit surface vertex 291 is parallel or substantially parallel to tangent 265' at vertex 280' of grating 200, to minimize the angles of incidence of the spatially separated radiation on exit surface 260' of optical conditioner 240'. Optical conditioner 240' is disposed in the first path between grating 200' and multielement detector 220'. In one example, grating 200' is concave, optical conditioner 240' has convex surface 225 and concave grating 200' is optically coupled to convex surface 225 of optical conditioner 240'. Grating 200 is reflective, and filler glass 227 optically couples concave grating 200' to convex grating surface 225 of optical conditioner 240'.

Figure 11:
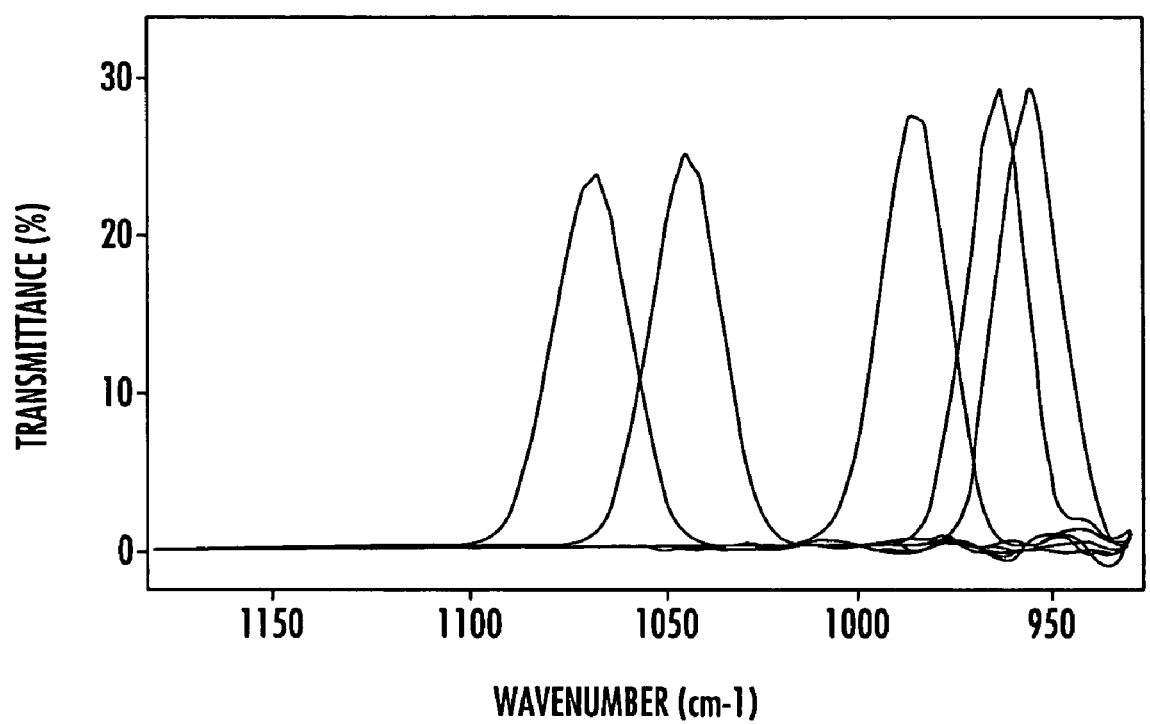
FIG. 11 is a graph showing typical spectral throughput curves in the mid-infrared range for a graded blaze angle grating in accordance with the present invention.

In another embodiment, the graded blaze angle grating of this invention is used in combination with the wedge-like optical conditioner having a flat exit surface parallel or substantially parallel to the tangent at the vertex of the grating to accommodate a flat array detector, as shown in FIG. 8A for example. FIG. 11 shows typical spectral throughput curves in the mid-infrared range for a graded blaze angle grating in accordance with the present invention. The prior art wedge-like conditioner design with a non-graded blaze angle grating had less than half the throughput of the graded blaze angle grating of the subject invention.

The substrate of the grating may be made of any material compatible with the thermal expansion of the conditioner, zinc selenide material in one example, or the grating may be formed directly on optical or wedge conditioner 240" as shown in FIG. 12A in highly schematic form. In a spectroanalytical system in accordance with the present invention including grating 200" integral with optical conditioner 240", FIG. 12A, optical conditioner 240" is disposed in the first path. Optical conditioner 240" includes proximal edge 241 and distal edge 242, including grating 200' on the distal edge having periodic faceted grooves 40a" . . . 40n" for spatially separating radiation as a function of wavelength. Blaze angles 42a" . . . 42n" of faceted grooves 40a" . . . 40n" are progressively graded to minimize the deviation from the local blaze angle at the grating vertex. Multielement detector 220" proximate proximal edge 241 detects radiation spatially separated by grating 200". Also in accordance with the present invention, optical conditioner 240" may have a curved exit surface (discussed above), or flat exit surface 260" on proximal edge 241", FIG. 12B. In either case, the tangent at the exit surface vertex is parallel or substantially parallel to the tangent at the vertex of the grating. In the case of a curved exit surface, FIG. 12A, the tangent 290" at the exit surface vertex 291" is parallel or substantially parallel to tangent 265" at vertex 280" of grating 200". In the case of a flat exit surface, FIG. 12B, the tangent 290'" at the exit surface vertex 291'" is parallel or substantially parallel to tangent 265'" at vertex 280'" of grating 200'".

As noted, multielement element detector 220'", FIG. 12B may be a flat detector array for detecting radiation spatially separated by grating 200'" wherein multielement detector 220'" may be physically separated from but optically coupled to flat exit surface 260'" diametrically opposite vertex 280'" of grating 200'". As with the system where the grating is not integral with the optical conditioner, one preferred embodiment includes the graded blaze angle grating, and the optical conditioner having a flat exit surface parallel or substantially parallel to the tangent at the vertex of the grating to accommodate a flat detector array. Whether separate from or integral with the optical conditioner, the grating may have its faceted grooves coated with gold. Also, although not shown, the faceted grooves in gratings 200" and 200'", FIGS. 12A and 12B, may be divided into zones, with the blaze angles, of each zone being different, as discussed above in connection with FIGS. 8A and 8B for example.

Thus, in accordance with the present invention, the optical conditioner having an exit surface tangent at the vertex parallel or substantially parallel to the tangent of the vertex of the grating minimizes the angle of incidence of the spatially separated radiation on the exit surface in order to provide optical coupling with a detector array whether flat or curved. Also in accordance with the present invention, the grating having graded blaze angles, whether continuous or divided into zones, maximizes the efficiency of the transmission of the radiation over the exit surface whether used in combination with the optical conditioner having a flat or curved exit surface for optical coupling with a detector array.

The subject invention including a grating having progressively graded groove facet angles to minimize the deviation from the local blaze angle at the vertex, and/or an optical wedge conditioner that can be coupled to a flat or curved detector array, results in an improved more efficient spectroanalytical system for the analysis of materials.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A spectroanalytical system for receiving radiation to be analyzed along a first path, the system comprising:
    a concave grating in the first path having periodic faceted grooves for spatially separating said radiation as a function of wavelength in which blaze angles of the faceted grooves are progressively graded to minimize deviation from a local blaze angle at the concave grating vertex;
    a multielement detector for detecting radiation spatially separated by the grating; and
    an optical conditioner disposed in said first path between the grating and the multielement detector.

2. The spectroanalytical system of claim 1 in which the grating is divided into multiple zones, the blaze angle of each zone being different.

3. The spectroanalytical system of claim 2 in which there are more than two zones.

4. The spectroanalytical system of claim 3 in which there are at least four zones.

5. The spectroanalytical system of claim 2 in which the blaze angle of each zone is selected to maximize intensity of the spatially separated radiation at an exit surface of the optical conditioner.

6. The spectroanalytical system of claim 2 in which the blaze angle with respect to the surface normal of each zone is within +3° of the vertex blaze angle.

7. The spectroanalytical system of claim 1 in which the angle of the grating groove facets to the grating vertex normal vary progressively.

8. The spectroanalytical system of claim 1 in which the grating is concave, the optical conditioner has a convex surface, and the concave grating is optically coupled to the convex surface of the optical conditioner.

9. The spectroanalytical system of claim 8 in which the grating is reflective.

10. The spectroanalytical system of claim 9 further including filler glass optically coupling the concave grating to the convex grating surface of the optical conditioner.

11. A spectroanalytical system for receiving radiation to be analyzed along a first path, the system comprising:
a grating in the first path having periodic faceted grooves for spatially separating said radiation as a function of wavelength;
a multielement detector for detecting radiation spatially separated by the grating; and
an optical conditioner disposed in said first path between the grating and the multielement detector, the optical conditioner having a tangent to the vertex of an exit surface parallel or substantially parallel to a tangent at the vertex of the grating to minimize angles of incidence of said spatially separated radiation on the exit surface of the optical conditioner.

12. The spectroanalytical system of claim 11 in which the conditioner exit surface is flat.

13. The spectroanalytical system of claim 11 further including a sample cell optically coupled to the optical conditioner.

14. The spectroanalytical system of claim 13 in which the sample cell is optically coupled to the optical conditioner by a compound parabolic concentrator.

15. The spectroanalytical system of claim 11 in which the multielement detector is physically separated from but optically coupled to the exit surface of the optical conditioner.

16. The spectroanalytical system of claim 12 in which the multielement detector is a flat detector array.

17. The spectroanalytical system of claim 11 in which the optical conditioner has a flat entrance surface along said first path.

18. The spectroanalytical system of claim 16 in which the flat array detector intersects a curved focal surface defined by the grating and conditioner at two points.

19. The spectroanalytical system of claim 17 in which said flat entrance surface intersects the Rowland Circle defined by the grating.

20. The spectroanalytical system of claim 11 in which the optical conditioner is wedge-like.

21. The spectroanalytical system of claim 20 in which the wedge-like optical conditioner has a taper between 0.3° and 2.0°.

22. The spectroanalytical system of claim 11 in which the optical conditioner is made of a material having an index of retraction of at least 2.0.

23. The spectroanalytical system of claim 11 in which the optical conditioner is made of high refractive index glass.

24. The spectroanalytical system of claim 11 in which the optical conditioner is made of zinc selenide.

25. A spectroanalytical system for receiving radiation to be analyzed along a first path, the system comprising:
a grating in the first path having periodic faceted grooves for spatially separating said radiation as a function of wavelength in which blaze angles of the faceted grooves are progressively graded;
a multielement detector for detecting radiation spatially separated by the grating; and
an optical conditioner disposed in said first path between the grating and the multielement detector, the optical conditioner having a tangent to the vertex of an exit surface parallel or substantially parallel to a tangent at the vertex of the grating to minimize angles of incidence of said spatially separated radiation on the exit surface of the optical conditioner.

26. The spectroanalytical system of claim 25 in which the multielement detector is physically separated from but optically coupled to the exit surface of the optical conditioner diametrically opposite the vertex of the grating to maximize throughput.

27. A spectroanalytical system for receiving radiation to be analyzed along a first path, the system comprising:
an optical conditioner disposed in the first path and having a proximal edge and a distal edge, the optical conditioner further including a concave grating on the distal edge having periodic faceted grooves for spatially separating said radiation as a function of wavelength in which blaze angles of the faceted grooves are progressively graded to minimize deviation from a local blaze angle at the concave grating vertex; and
a multielement detector proximate the proximal edge of the optical conditioner for detecting radiation spatially separated by the grating.

28. A spectroanalytical system for receiving radiation to be analyzed along a first path, the system comprising:
an optical conditioner disposed in said first path having periodic faceted grooves for spatially separating said radiation as a function of wavelength on its distal edge, the optical conditioner also having a tangent to the vertex of an exit surface parallel or substantially parallel to a tangent at the vertex of the grating on its proximal edge to minimize angles of incidence of said spatially separated radiation on the exit surface; and
a multielement detector for detecting radiation spatially separated by the grating wherein the multielement detector is optically coupled to the exit surface of the optical conditioner diametrically opposite the vertex of the grating to maximize throughput.

29. A spectroanalytical system for receiving radiation to be analyzed along a first path, the system comprising:
an optical conditioner disposed in said first path having a proximal edge and a distal edge, the optical conditioner including:
a grating on the distal edge having periodic faceted grooves for spatially separating the radiation as a function of wavelength in which blaze angles of the faceted grooves are progressively graded; and
a flat exit surface parallel or substantially parallel to the tangent at the vertex of the grating on the proximal edge to minimize angles of incidence of said spatially separated radiation on the flat exit surface; and
a multielement detector for detecting radiation spatially separated by the grating wherein the multielement detector is optically coupled to the flat exit surface of the optical conditioner diametrically opposite the vertex of the grating to maximize throughput.

30. A spectroanalytical system for receiving radiation to be analyzed along a first path, the system comprising:
- a concave grating in the first path for spatially separating said radiation as a function of wavelength, the grating including progressively graded groove facet angles to minimize deviation from a local blaze angle at the concave grating vertex;
- a multielement detector for detecting radiation spatially separated by the grating; and
- an optical conditioner disposed in said first path between the grating and the multielement detector, the optical conditioner having a flat exit surface,
- wherein the multielement detector is optically coupled to the flat exit surface of the optical conditioner.

31. A spectroanalytical system for receiving radiation to be analyzed along a first path, the system comprising:
- a concave grating in the first path for spatially separating said radiation as a function of wavelength, the grating including progressively graded groove facet angles to minimize deviation from a local blaze angle at the concave grating vertex;
- a detector subsystem for detecting radiation spatially separated by the grating; and
- an optical conditioner disposed in said first path between the grating and the detector subsystem.

32. The spectroanalytical system of claim 31 in which the optical conditioner has a flat exit surface parallel or substantially parallel to the tangent at the vertex of the grating to minimize angles of incidence of said spatially separated radiation on the flat exit surface of the optical conditioner.

33. The spectroanalytical system of claim 32 wherein the detector subsystem is a flat detector array optically coupled to the flat exit surface of the optical conditioner diametrically opposite the vertex of the grating to maximize throughput.

34. A spectroanalytical system for receiving radiation to be analyzed along a first path, the system comprising:
- a grating having faceted grooves in the first path for spatially separating said radiation as a function of wavelength in which blaze angles of the grooved facets of the grating are progressively graded;
- a multielement detector for detecting radiation spatially separated by the grating;
- an optical conditioner disposed in said first path between the grating and the multielement detector, the optical conditioner including a tangent to the vertex of an exit surface parallel or substantially parallel to a tangent at the vertex of the grating to minimize angles of incidence of said spatially separated radiation on the exit surface of the optical conditioner,
- wherein the multielement detector is optically coupled to the exit surface of the optical conditioner diametrically opposite the vertex of the grating to maximize throughput; and
- a sample cell optically coupled to the optical conditioner by a compound parabolic concentrator.

35. A spectroanalytical system for receiving radiation to be analyzed along a first path, the system comprising:
- a grating in the first path for spatially separating said radiation as a function of wavelength, the grating including progressively graded groove facet angles;
- a detector subsystem for detecting radiation spatially separated by the grating; and
- an optical conditioner disposed in said first path between the grating and the detector subsystem, said optical conditioner having a flat exit surface parallel or substantially parallel to the tangent at the vertex of the grating to minimize angles of incidence of said spatially separated radiation on the flat exit surface of the optical conditioner.

36. The spectroanalytical system of claim 35 wherein the detector subsystem is a flat detector array optically coupled to the flat exit surface of the optical conditioner diametrically opposite the vertex of the grating to maximize throughput.

* * * * *